United States Patent [19]

Oh et al.

[11] Patent Number: 5,158,055
[45] Date of Patent: Oct. 27, 1992

[54] COMBUSTION CHAMBER OF INTERNAL-COMBUSTION ENGINE

[75] Inventors: Sae Z. Oh; Woo Kang; Jae H. Chung; Bok H. Cho, all of Seoul, Rep. of Korea

[73] Assignee: Korea Institute of Science and Technology, Seoul, Rep. of Korea

[21] Appl. No.: 697,449

[22] Filed: May 9, 1991

[30] Foreign Application Priority Data

Aug. 30, 1990 [KR] Rep. of Korea .................. 90-13482

[51] Int. Cl.⁵ .................. F02B 19/16; F02B 19/08
[52] U.S. Cl. .................. 123/276; 123/263
[58] Field of Search .................. 123/276, 279, 262, 263

[56] References Cited

U.S. PATENT DOCUMENTS

| | | | |
|---|---|---|---|
| 3,302,627 | 2/1967 | Morris | 123/276 |
| 3,374,773 | 3/1968 | Scherenberg | 123/276 |
| 4,176,628 | 12/1979 | Kanai et al. | 123/276 X |
| 4,538,566 | 9/1985 | Tsuruoka | 123/276 |
| 4,616,612 | 10/1986 | Jane | 123/276 |

FOREIGN PATENT DOCUMENTS 2652662  3/1978  Fed. Rep. of Germany .
58-12632  1/1983  Japan .
60-11624  1/1985  Japan .
60-24289  6/1985  Japan .
60-56893  12/1985  Japan .

Primary Examiner—Tony M. Argenbright
Attorney, Agent, or Firm—Oblon, Spivak, McClelland, Maier & Neustadt

[57] ABSTRACT

The invention relates to a combustion chamber formed in the upper end of the piston of the diesel engine and, more particularly, to a geometrical shape of a combustion chamber of a piston. The combustion chamber includes a main combustion chamber and a plurality of auxiliary chambers. The main combustion chamber has a diameter d in the range of 0.522-0.552 times the piston diameter D. The auxiliary chamber has a tunnel like shape having a half-circle shaped cross section having a base line with a radius in the range of 0.095D-0.200D or 0.179d-0.370d from the upper end to the lower end of the side wall of the main combustion chamber of the piston cavity. The above half-circle is centered at a point where it is on a circumference whose radius is in the range of 0.105D-0.238D or 0.190d-0.446d from the center of the main combustion chamber circle and is located in between two sprays.

1 Claim, 3 Drawing Sheets

COMBUSTION CHAMBER OF INTERNAL-COMBUSTION ENGINE

BACKGROUND OF THE INVENTION

1. Field of the Invention

This invention relates to a combustion chamber of an internal-combustion engine and more specifically to a geometrical shape of a piston cavity of a combustion chamber.

2. Discussion of the Background

In the prior art combustion chamber of a diesel cycle engine, the quantity of noxious gas generated during the combustion process depends on the nature of the injected fuel and the geometrical shape of the combustion chamber wherein the injected fuel and the air are mixed and, more particularly, on the piston cavity shape of the combustion chamber. Piston cavities of combustion chambers have a variety of shapes such as a shallow dish shape, a toroidal shape, a reentrant shape, a Meurer shape, a spherical shape, a quadrangular shape etc. and variations of the above-noted shapes.

Deep piston cavities of combustion chambers have a tendency to emit a lot of hydrocarbon and nitrogen oxides and generate a lot of smoke when the engine is accelerated. Medium depth piston cavities of combustion chambers with various shapes are generally used for small and medium engines (refer to Japanese Patent Publication (B2) No. (Sho) 60-56893). Reentrant shape piston cavities are known as giving better mixation of fuel together with air by better squish air motion occurring at the end of compression by piston.

In order to get optimum combustion, the combustion chamber is so constructed that the injected fuels are primarily mixed with the air swirl generated and are burned in the combustion chamber, thereafter the smoke (polymer) resulting therefrom is reburned and also unburned hydrocarbon and carbon monoxides are reburned simultaneously with the proper quantity of remaining air. Also if the smoke, hydrocarbons and carbon monoxides are secondarily reburned and thus their quantities are remarkably reduced, then one can adjust the combustion procedure so as to reduce the generation of nitrogen oxide compounds. In order to inject the secondary air, another air injection valve may be mounted, but it cannot give satisfactory results. Since the time period of the combustion procedure is extremely short and the diffusion combustion during which the secondary air is needed is shorter than the above, and thus setting the injection time and adjusting quantity of the injection air in accordance with engine load, the injection quantity of fuel become very complicated to determine.

Therefore, it is most desirable that this be done in some manner in a combustion chamber in which air is not used for the initial combustion stage and is used for the diffusion combustion period. In actuality, such a device depends on the geometrical shape of the combustion chamber. Among the methods for arranging the device described above, given the recessed space in the bottom surface of a cavity, this cannot give satisfactory results since the fuel penetrates into and fills the space before combustion occurs. Usually the injection directions of the fuel are from the top of combustion chamber to the bottom of the cavity, even if it is somewhat with an inclination and the injection pressures is very high. However, if the recessed space is made perpendicular to the direction that the piston ascends and descends, and fuel is sprayed so as to hit the wall of the piston main cavity of the combustion chamber, the injected fuel forms circles, moves in a swirling action and burns so that the air in the space is not used for the initial combustion stage but rather is used for the diffusion combustion stage.

Therefore, a quadrangular shaped combustion chamber was made for a toroidal shaped piston cavity, however it has not only a drawback in that the required quantity of the secondary air cannot be optimized but also the force of eddy flow is not strong enough in utilizing the secondary air for attaining the required objectives, while the outlet of the space is dispersed as shown in FIG. 4-A (refer to Japanese Patent Publication (B2) No. (Sho) 60-24289).

DISCLOSURE OF THE INVENTION

The object of the present invention is to provide a combustion chamber of a diesel cycle engine which is free of the aforementioned defects and has better efficiency in the use of the secondary air than in the case of a quadrangular shaped combustion chamber, and thus provides a drastic reduction of harmful pollutant emissions such as nitrogen oxides by applying the present invention to toroidal type piston cavity of a combustion chamber.

In accordance with the above object, the present invention provides a combustion chamber formed in the upper end of a piston of a fuel injection type diesel engine comprising (a) a cylindrical cavity which forms a main combustion chamber whose diameter d is in the range of 0.522 to 0.552 times the piston diameter D; and (b) a plurality of tunnel-shaped recesses which form auxiliary chambers whose cross-sections are partial-circles that extend from the upper end to the lower end of the main combustion chamber; each recess having a radius in the range of $0.095D$ to $0.200D$ or $0.179d$ to $0.370d$ and the centers of the recesses being disposed on the circumference of a circle whose center is also the center of the cylindrical cavity; the distance between the center of each recess and the center of the cylindrical cavity being in the range of $0.105D$ to $0.238D$ or $0.190d$ to $0.446d$ and the center of each recess being located between the spraying directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
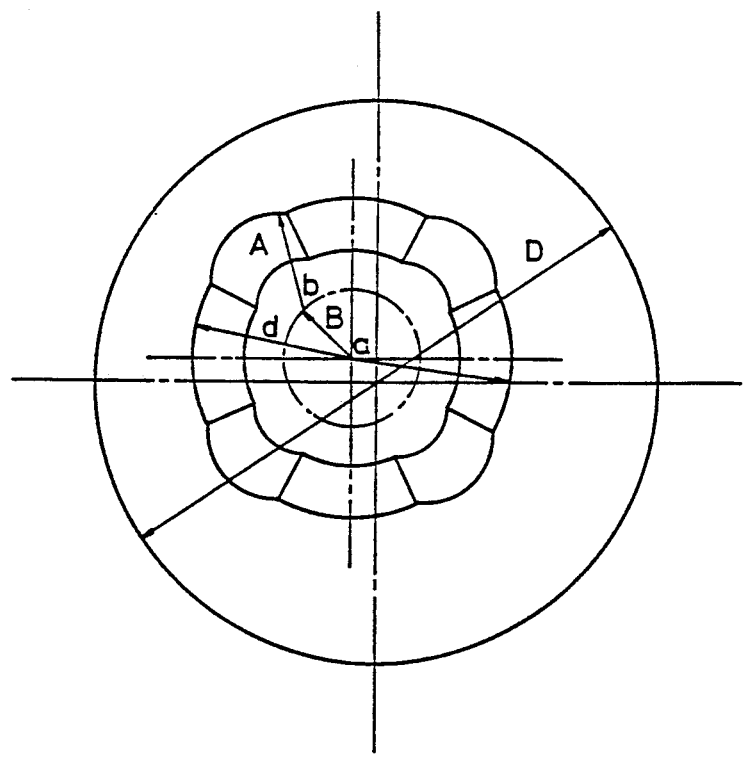
FIG. 1 is a schematic illustration of the combustion chamber of the internal-combustion engine according to the present invention showing its geometrical shape in a direction perpendicular to the axis of the piston.
Figure 2:
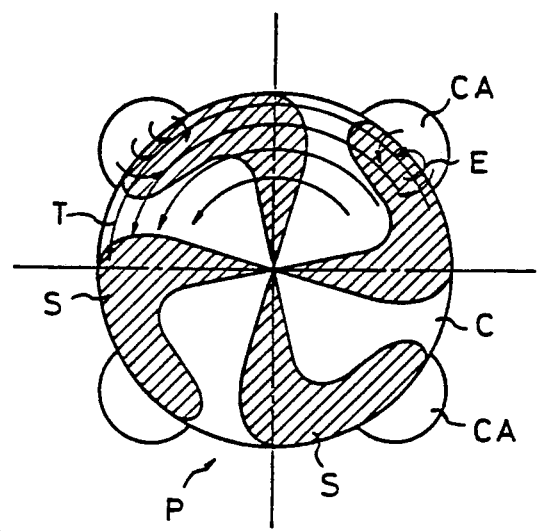
FIG. 2 is a schematic illustration showing the air flow in the piston combustion chamber according to the present invention.
Figure 3:
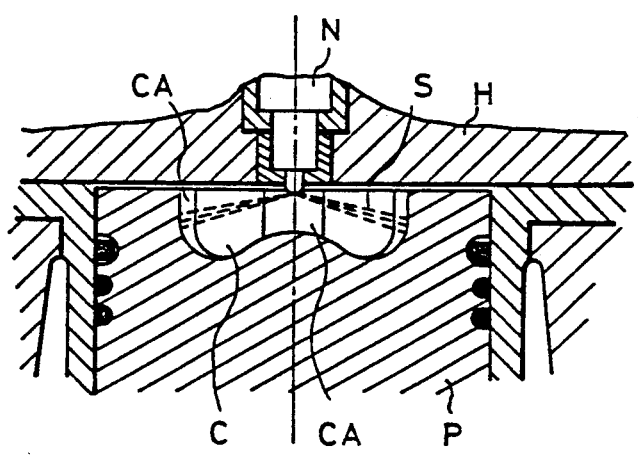
FIG. 3 is a fragmentary enlarged sectional view of the combustion chamber according to the present invention in the assembled state showing the fuel spread.

Referring now to the drawings and more particularly FIGS. 2 and 3, the fuel S is injected at high pressure from a fuel injection nozzle N mounted in the cylinder head H into the cavity of combustion chamber C formed in the upper end of the piston P and is spread by the swirling action T formed in the main combustion chamber C in the direction of the swirl along the wall of the piston combustion chamber, and then is ignited and burned. When the fuel-air mixed gas in the swirling action is spread and burned, the air in the auxiliary chamber CA provided between the fuel sprays S is expanded due to the heat transfer of the high temperature combustion gas and penetrates the fuel spray in the direction of the center of the main combustion chamber, by generating pulses and providing a good mixture of secondary air with burning combustibles.

Figure 4A:
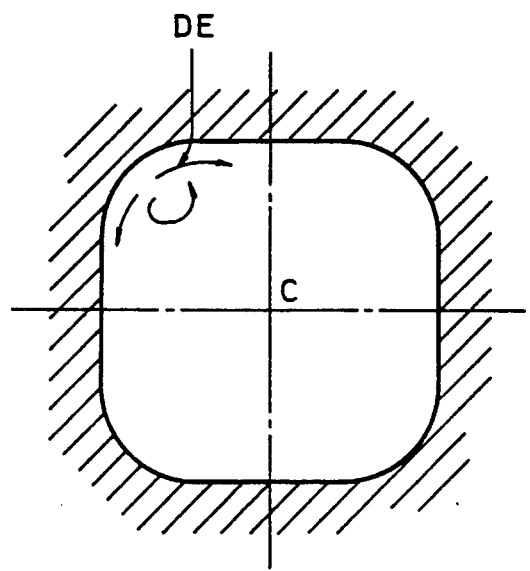
FIGS. 4A and 4B are schematic illustrations respectively showing the comparison of eddy air motions at the corner of the cavities in a direction perpendicular to the axis of the pistons between the present invention and the quadrangular cavity within a toroidal type piston cavity.
Figure 4B:
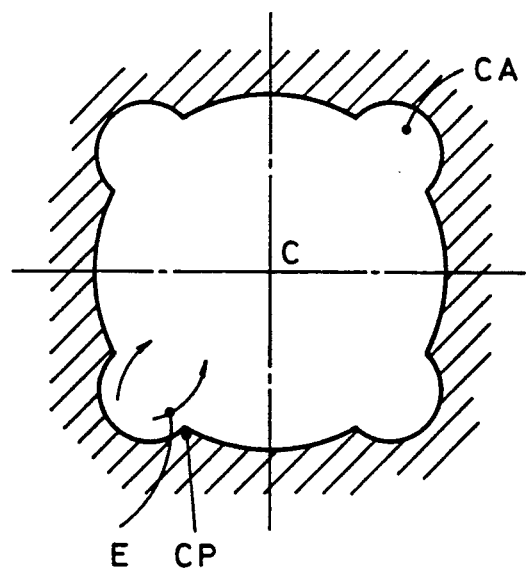

The phenomena of secondary air motion occurring in the cavity which generates a mixing effect in the diffusion combustion stage is as shown in FIG. 4A. FIG. 4A shows the section of an existing quadrangular type cavity, where the eddy DE occurring at the corner of the cavity in the combustion process is so diffused that the penetration effect of air to the direction of center of the cavity is too weak to generate a mixing effect with combustibles. However, in the present invention as shown in the FIG. 4B, the tunnel-like recess provided from the top of piston cavity through the bottom of the piston cavity is so formed as to have protruded edges CP so as to become a kind of a chamber able to contain fresh air heated during the combustion process so as to penetrate to the direction of the center of the piston cavity, which provides an excellent mixation effect with the combustibles during diffusion combustion stage.

As a result, the diffusion combustion is efficiently made and also the combustion gas is cooled so as to reduce the generation of the nitrogen oxides and burn out the rest of the combustibles simultaneously. This secondary effect depends on the shape, size and the position of the auxiliary chamber CA, and the number of auxiliary chamber CA is related to the number of fuel sprays. In any case spray S shall be inbetween the recess of auxiliary chamber CA.

The geometrical shape of the piston cavity, of the combustion chamber formed on the upper portion of the piston according to the present invention is defined as follows.

At first, the main combustion chamber C has a diameter d in the range of 0.522–0.552 times the piston diameter D. A plurality of tunnel-shaped recesses which form auxiliary chambers CA whose cross-sections are partial-circles extend from the upper end to the lower end of the main combustion chamber C; the radius A of each recess is in the range of 0.095D to 0.200D or 0.179d to 0.370d and the centers of the recesses form a circle whose center is also the center of the cylindrical cavity; the distance B between the center of each recess and the center of the cylindrical cavity being in the range of 0.105D to 0.238D or 0.190d to 0.446d and the center of each recess being located between the spraying directions.

Four auxiliary chambers CA are shown in the drawings, however, it is understood that the invention is not limited to the specific embodiment shown.

By defining the geometrical shape of the combustion chamber as the above, which is the gist of the invention, the experiments proved that the discharge of nitrogen oxides, carbon monoxides, unburned hydrocarbons and smoke is remarkably reduced. The discharged quantity of NOx through the combustion chamber according to the present invention is 230 ppm–273 ppm, when measured by the test method of pollution control regulation which is commonly used in Korea and Japan, which is remarkably lower than the permissible limit in Korea, i.e., 850 ppm, or the permissible limit in Japan, i.e., 540 ppm. The discharge of CO is 349 ppm, which is lower than the Korean permissible limit or the Japanese permissible limit. The Smoke Bosch is 4, which is lower than the permissible limit of 5. Thus the combustion chamber of the present invention has a surprising effect. The result is by far competitive to re-entrant type combustion chamber (U.S. Pat. No. 4,538,566 dated Sep. 3, 1985). Also, the structure of the present invention is much easier for manufacturing than re-entrant type combustion chambers.

While there has been described a preferred form of the invention, obviously modifications and variations are possible in light of the above techniques. It is therefore to be understood that within the scope of the appended claims, the invention may be practiced otherwise than as specifically described.

What is claimed is:

1. A toroidal type piston chamber formed in the upper end of a piston of a fuel injection type diesel engine, comprising:

a cylindrical cavity which forms a main combustion chamber whose diameter d is in the range of 0.522 to 0.552 times the piston diameter D; and a plurality of tunnel-shaped recesses which form auxiliary chambers whose cross-sections are partial-circles that extend from the upper end to the lower end of the main combustion chamber; wherein the radius of each recess is in the range of 0.179d to 0.34d, and the centers of the recesses form a circle whose center is also the center of the cylindrical cavity; wherein the distance between the center of each recess and the center of the cylindrical cavity is in the range of 0.190d to 0.446d and wherein the center of each recess is located between two fuel sprays.

* * * * *